Aug. 8, 1933.    O. J. JOHNSON    1,921,925
DENTAL FLASK
Filed June 28, 1932
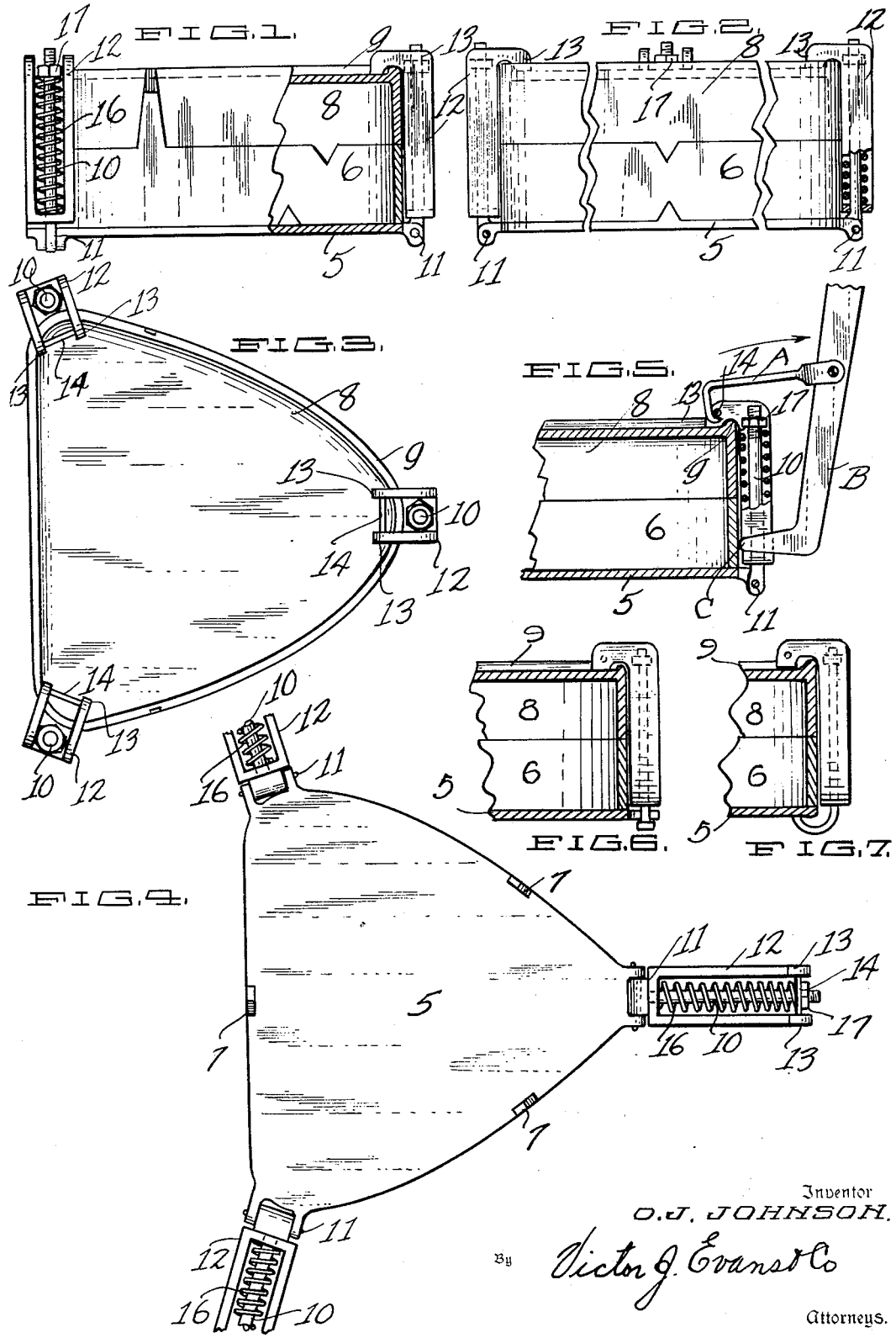
Inventor
O. J. JOHNSON.
By Victor J. Evans & Co
Attorneys.

Patented Aug. 8, 1933

1,921,925

UNITED STATES PATENT OFFICE 1,921,925

DENTAL FLASK

Orlando J. Johnson, Klamath Falls, Oreg.

Application June 28, 1932. Serial No. 619,784

2 Claims. (Cl. 18—33)

This invention relates to improvements in dental devices.

The principal object of the invention is to provide a dental flask with securing means whereby the various sections of the flask will be securely held in proper alignment.

A further object is to produce a device wherein a steady pressure will be maintained during the molding operation.

A further object is to produce a device which is economical to manufacture.

A still further object is to produce a device wherein the pressure is at the edges of the flask thereby preventing warping such as occurs when the pressure is exerted at the center of the flask as is common practice.

Other objects and advantages will be apparent during the course of the following description.

In the accompanying drawing forming a part of this specification and in which like numerals are employed to designate like parts throughout the same, Fig. 1 is a side elevation of Fig. 3, showing a portion thereof broken away, Fig. 2 is an end elevation of Fig. 3, looking from the left of the drawing, Fig. 3 is a top plan view of Fig. 1, Fig. 4 is a top plan view of the bottom plate and retaining claims, Fig. 5 is a fragmentary detail view showing the manner in which the clamps may be removed, Fig. 6 is a fragmentary detail view showing a modified form of clamping means for detachably securing the U-shaped clamp to the plate of the device, and Fig. 7 is a similar view showing another modification for performing the same function.

In the making of dental plate it is common to take an impression of the patient's mouth in wax or other soft material, to then make a plaster mold of this impression which plaster mold serves as a matrix in which the rubber or other material in which the teeth are to be embedded, is molded. This material, when placed in a mold, is relatively hard in that it softens during the vulcanizing process and in so doing oozes into the various interstices of the mold. During this molding process it is necessary to have a uniform pressure so as to draw the parts of the mold together without causing any lateral displacement and also to force this rubber or vulcanizing material into the various parts of the mold where it is needed.

In the accompanying drawing wherein for the purpose of illustration is shown a preferred embodiment of my invention, the numeral 5 designates a bottom plate which is preferably shaped somewhat similar to the shape of a dental plate, but it is of course obvious that this plate may be of any desired configuration without departing from the spirit of the invention. The numeral 6 designates an upstanding ring-shaped portion which rests upon the plate 5 and is positioned through the medium of interlocking projections 7 which fit into similar recesses formed upon the ring 6. The top section is shown at 8. It will be noted that a rim 9 is formed about this top section. The bottom 5, ring 6 and top section 8 combine to form what is known as a dental flask, which holds the mold and parts to be molded. In order to lock these parts of the flask together I provide a U-shaped clamp 12 having hooked extremities 13 between which hooked extremities extends a cross piece 14. There are three of these clamps held to the bottom 5 by bolts 10, pivoted as at 11 and passing through the U-shaped members 12. A spring 16 is interposed between the nut 17 and the bottom of the U-shaped member 12. This spring is preferably under compression and surrounds the bolt 10.

The result of this construction is that when the bottom, the ring and the top of the flask are assembled, the clamping members may be moved from the position of Fig. 4 to the position of Fig. 1 so that the hooked ends 13 will engage the rim 9. This may be accomplished by employing a tool such as shown in Fig. 5, the tool having a hooked portion A which is connected to a lever B. By reversing the tool from the position shown in this figure so that the nose C rests upon the top and the hook engages the cross piece 14, it will be obvious that the clamp may be quickly lifted and placed over the rim of the device. When it is desired to remove the clamps from the flask then the tool is used in the position shown in this figure.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a dental flask, a bottom plate having a plurality of upstanding lugs formed thereon, a ring positioned on said plate and registering with said lugs, a cover portion mounted on said ring, said cover portion having a rim extending upwardly therefrom, a plurality of bolts pivotally attached to said bottom plate, a U-shaped member slidable on each of said bolts, a spring interposed between the legs of said U-shaped member and encircling the bolt thereof, the legs of said U-shaped members having hooked extremities adapted to engage said rim.

2. In a dental flask, a bottom plate having a plurality of upstanding lugs formed thereon, a ring positioned on said plate and registering with said lugs, a cover portion mounted on said ring, said cover portion having a rim extending upwardly there-from a plurality of bolts pivotally attached to said bottom plate, U-shaped members slidable on each of said bolts, a spring interposed between the legs of each U-shaped member and encircling the bolt thereof, the legs of said U-shaped members having hooked extremities adapted to engage said rim, and a cross piece connecting said hooked extremities whereby said U-shaped member may be moved on said bolt against the action of said spring.

ORLANDO J. JOHNSON.